United States Patent [19]

Heintz et al.

[11] 4,164,263

[45] Aug. 14, 1979

[54] VIBRATION REJECTING IMPACT SENSOR, PARTICULARLY TO TRIGGER A VEHICULAR COLLISION SAFETY SYSTEM

[75] Inventors: Frieder Heintz, Stutensee; Walter Jansche, Durmersheim, both of Fed. Rep. of Germany

[73] Assignee: Robert Bosch GmbH, Stuttgart, Fed. Rep. of Germany

[21] Appl. No.: 850,558

[22] Filed: Nov. 11, 1977

[30] Foreign Application Priority Data

Dec. 8, 1976 [DE] Fed. Rep. of Germany ....... 2655604

[51] Int. Cl.² ............................................. B60R 21/00
[52] U.S. Cl. ................................. 280/735; 73/517 R; 297/480; 180/268; 180/282
[58] Field of Search .............. 180/82 R, 82 C, 103 R, 180/103 A; 280/734, 735; 73/517 R

[56] References Cited

U.S. PATENT DOCUMENTS

| 3,528,297 | 9/1970 | Lee ..................................... 73/517 R |
| 3,572,109 | 3/1971 | Yerman ........................... 73/517 R X |
| 3,636,774 | 1/1972 | Allison ............................ 73/517 R X |

*Primary Examiner*—Joseph F. Peters, Jr.
*Assistant Examiner*—Michael Mar
*Attorney, Agent, or Firm*—Flynn & Frishauf

[57] ABSTRACT

A moveable mass is part of a resilient spring system, in which the spring is a leaf spring restrained in a housing. Strain gauges are applied to the leaf spring, the outputs of which are integrated in a bi-polar integrator. Vibration of the leaf spring will cause sequential integration in reverse direction and, accordingly, a low output signal; deflection of the mass, for example upon on impact, will cause the integrator to provide a strong integrating signal which can trigger a collision safety system. The inherent, or characteristic frequency of the system is so selected that it is above the frequency occurring upon an impact of the sensor, or upon collision, but below the frequency occurring due to concussions to which the vehicle, or the mounting post of the apparatus on the vehicle, is subjected in use, or repair.

9 Claims, 2 Drawing Figures

VIBRATION REJECTING IMPACT SENSOR, PARTICULARLY TO TRIGGER A VEHICULAR COLLISION SAFETY SYSTEM

The present invention relates to an impact sensor, particularly to trigger response of a collision safety system, for example an air bag in an automotive vehicle, and more particularly to such a sensor which will be essentially immune to vibration resulting from concussions to which the vehicle is subjected, but which will reliably indicate a collision.

BACKGROUND AND PRIOR ART

Various types of impact sensors have been proposed in order to trigger safety devices to protect passengers in vehicles, typically automobiles. Some of those sensors, as previously proposed, use a spring element and a mass secured to the spring element, the mass being deflected upon impact against the spring force. Deflection of the mass against the spring force closes electrical contacts. Such contacts, of course, are used only infrequently—desirably never—but when they are operated, they must operate reliably. Long disuse of the contacts within the operating life of the vehicle; may cause operating problems when they are actually needed.

THE INVENTION

It is an object of the present invention to provide a sensor which reliably provides outputs upon deflection of a moveable mass, without resort to electrical mechanically operated contacts which are to be operated, typically closed.

Briefly, a moveable mass is supported on a spring for deflection upon impact. A strain gauge is secured to the spring, the strain gauge providing an electrical output signal which is connected to an evaluation circuit, the system being so arranged that signals having a frequency above a predetermined limit are effectively rejected. Preferably, the strain gauge is connected to a bridge circuit, the output of which is integrated in a bi-polar integrator and the integration level sensed in a threshold circuit. The inherent, or characteristic frequency of the system of the spring and the mass is preferably so selected that it is in a region above the frequencies occurring upon collision of the vehicle, and below the frequencies to which the vehicle, or the mounting of the sensor may be subjected due to concussions suffered by the vehicle, for example upon driving over poor roads, hammer blows during repairs, or the like.

The output signals from the strain gauges are low-level; to prevent transfer of spurious signals due, for example, to high-frequency interference or noise pulses which might reach components of the safety device, an amplifier, the integrator, and the threshold circuit are physically closely associated with the spring-mass sensing system and the strain gauges in a common housing. The output from the combined unit thus will be a high-level threshold circuit output signal.

The sensor has the advantage that the inherent or characteristic frequency can readily be selected, and the evaluation circuit, by means of a simple and reliable electrical circuit can select those frequencies which occur upon collision and discriminate with respect to frequencies which arise, for example, due to vibration occurring upon concussions or blows on the vehicle or on the sensor so that inadvertent triggering of a safety device, for example an air bag, is reliably prevented.

Drawings, illustrating an example:

Figure 1:
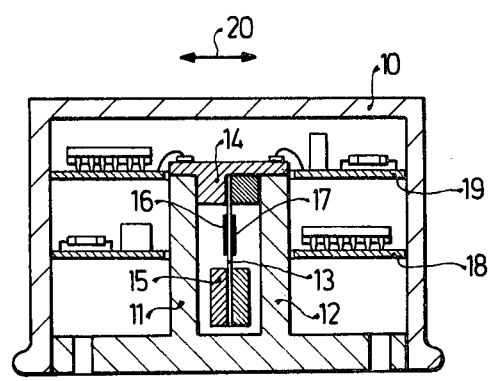
FIG. 1 is a highly schematic vertical cross sectional view of the sensor.
Figure 2:
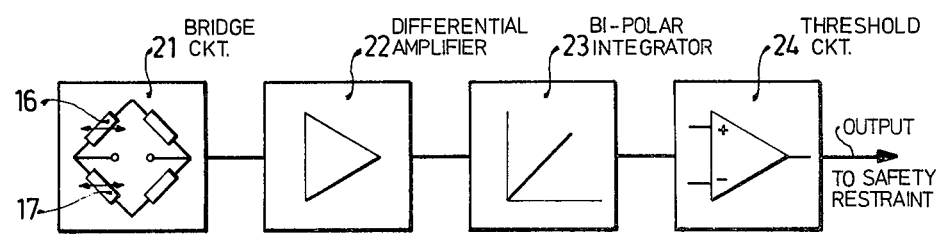
FIG. 2 illustrates in schematic block diagram form the sensor arrangement and the evaluation circuit connected thereto.

A housing 10 (FIG. 1) is formed with an internal chamber or well defined by internally projecting walls 11, 12. A leaf spring 13 is secured to a carrier 14 supported from the internal walls 11, 12. The lower end of the leaf spring 13 has a deflection mass 15 secured thereto. The portion of the spring 13 between its attachment 14 and the mass 15 has two strain gauge strips 16, 17 attached thereto. The electrical output leads from strain gauges 16, 17 are carried through the support 14 to terminal buttons secured thereto. Printed circuit boards 18, 19, for example of circular form and fitting around the walls 11, 12 are secured inside the housing to the walls 11, 12 and to the inner walls of the housing. The printed circuit boards 18, 19 contain the electrical components of the evaluation circuit, connected to the terminal buttons from strain gauges 16, 17 on the support 14. The direction of installation of the housing 10 is selected such that the spring 13 can deflect backwardly and forwardly with respect to the longitudinal axis of the the vehicle, which is schematically indicated by the double arrow 20.

The inherent or characteristic frequency of the spring-mass system 13, 15 is so selected that it is above those frequencies which have to be sensed which occur upon impact or collision of the vehicle. The inherent or characteristic frequency is, however, below that frequency to which the vehicle may be subjected due to blows thereon, vibration, or concussions suffered by the vehicle. The characteristic frequency is preferably selected to be in the range of about between 100 Hz to 300 Hz. Blows with substantially higher frequency only cause the sensor to vibrate with its own characteristic frequency. Such blows may occur, for example, upon repair or maintenance on the vehicle by stones or rocks being thrown thereagainst upon movement, upon acceleration on poor road surfaces, cobblestones or the like.

The evaluation circuit, the components of which are physically placed on printed circuit boards 18, 19 includes a differential amplifier 22, connected to the output of a bridge circuit 21. The strain gauges 16, 17 form two legs of the bridge 21. The output signal from differential amplifier 22 is connected to a bi-polar, or bi-directional integrator 23. The integrator will integrate in positive, or negative direction, in accordance with the polarity of the signal received from the differential amplifier 22. The output of the integrator 23 is applied to a comparator 24 which, for example, may by an operational amplifier. Comparator 24 provides an output signal which can be compared with a reference, determining a switching threshold, so that comparator 24 will operate as a threshold switch. The output from comparator, or threshold switch 24 is the operation, or function output of the sensor and can be used to control a passenger restraint system in a motor vehicle, for example an air bag.

Operation: Upon deflection of spring 13 (FIG. 1), and depending on the direction of deflection thereof, an electrical output signal will be derived from the diagonal from bridge 21, the output signal being amplified in differential amplifier 22 and applied to integrator 23 which then will integrate the respective input signal. The integrator will change its direction of integration, that is, in positive or negative direction, in dependence on the input derived from the differential amplifier 22. If the oscillation derived from the strain gauges 16, 17 are within the inherent or characteristic frequency range thereof, integrator 23 will change its direction of integration rapidly and frequently. The net output from the integrator, therefore, will be small and the threshold of threshold circuit 24, that is, its comparison threshold level is so set that it will not be exceeded under those conditions. If, however, the spring 13 is deflected due to deflection of mass 15 upon collision of the vehicle, that is, a serious impact, integrator 23 will retain its direction of integration for a much longer period of time. The output signal of the integrator 23 will thus exceed the threshold level of the comparison threshold of circuit 24. Rapid oscillation of spring 13 in the region of its inherent or characteristic frequency will never reach the threshold level of switch 24 and no output signal will be derived from circuit 24. Yet, impact of the vehicle upon collision will cause spring 13 to deflect or oscillate at relatively low frequency so that the integrator 23 will exceed the threshold level of circuit 24 and provide an output signal to trigger a protective system for the passengers of the vehicle.

The system not only is immune with respect to frequencies in the order of the inherent or characteristic frequency of the spring-mass system 13, 15, but is also immune against high frequency interference or noise pulses which might reach the components of the system.

Various changes and modifications may be made within the scope of the inventive concept.

We claim:

1. For installation in a vehicle having a vehicular collision safety restraint system, a vibration rejection, impact sensing unit comprising
   a common housing (10, 11, 12) and
   the combination of an impact sensor effectively immune to vibration or concussion, but sensing a collision impact of the vehicle, and providing a sensor signal, with an electric evaluation circuit providing a collision safety restraint output signal;
   wherein the sensor comprises
   a resilient spring-mass system including a movable mass (15) and a spring (13) secured in the housing at an attachment portion at a freely movable portion of the spring (13),
   and at least one strain gauge (16, 17) secured to the spring (13) and providing said sensor signal;
   and the electric evaluation circuit is connected to said at least one strain gauge (16, 17) and comprises
   means rejecting signals having a frequency above a predetermined limit,
   an amplifier (22),
   and a threshold circuit (24) providing the collision safety restraint output signal if the threshold level of the threshold circuit is exceeded,
   the circuit components of said evaluation circuit being located within said common housing for closely adjacent physical association of said circuit components with said at least one strain gauge.

2. Unit according to claim 1, wherein the spring is a leaf spring (13) restrained at one end thereof and having the moveable mass (15) secured to another end thereof;
   and two strain gauges are provided located at opposite sides of the spring (13) intermediate its ends.

3. Unit according to claim 2, wherein the evaluation circuit includes a bridge circuit (21) to which said strain gauges are connected, the strain gauges forming two legs of said bridge;
   and a bipolar integrator (23) integrating the output from the bridge circuit, the threshold circuit (24) being connected to the bipolar integrator and providing said collision safety restraint output signal if the output of the integrator exceeds the threshold level of the threshold circuit.

4. Unit according to claim 3, wherein the amplifier (22) is a differential amplifier connected between the bridge circuit and the bipolar integrator.

5. Unit according to claim 4, wherein the inherent, or characteristic frequency of the spring-mass system (13, 15) is in the region of about between 100 to 300 Hz.

6. Unit according to claim 1, wherein the inherent, or characteristic frequency of the spring-mass system is above the frequencies to be sensed upon impact or collision of the vehicle, and below the frequencies occurring upon concussions or blows suffered by the vehicle, or by the sensor.

7. Unit according to claim 6, wherein the inherent or characteristic frequency of the spring-mass system is in the region of about between 100 to 300 Hz.

8. Unit according to claim 1, wherein the evaluation circuit includes an integrator (23), the threshold circuit (24) being connected to the integrator and providing the collision safety restraint output signal if the output of the integrator rises above the threshold level of the threshold circuit.

9. Unit according to claim 1, wherein the evaluation circuit includes a bipolar integrator (23), the threshold circuit (24) being connected to the bipolar integrator and providing the collision safety restraint output signal if the output of the integrator rises above the threshold level of the threshold circuit.

* * * * *